No. 725,322. PATENTED APR. 14, 1903.
E. P. DAVIS.
BRACELET OR THE LIKE.
APPLICATION FILED SEPT. 27, 1902.
NO MODEL.
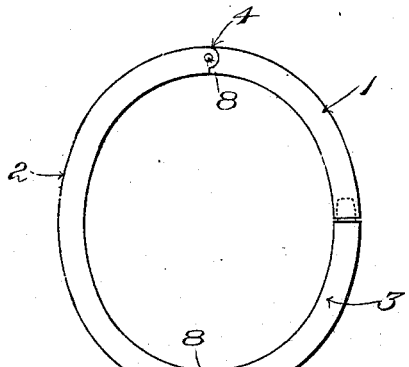
Fig. 1.
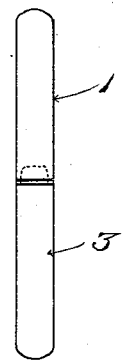
Fig. 2.
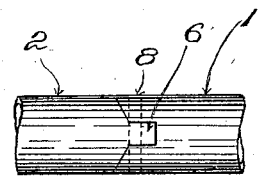
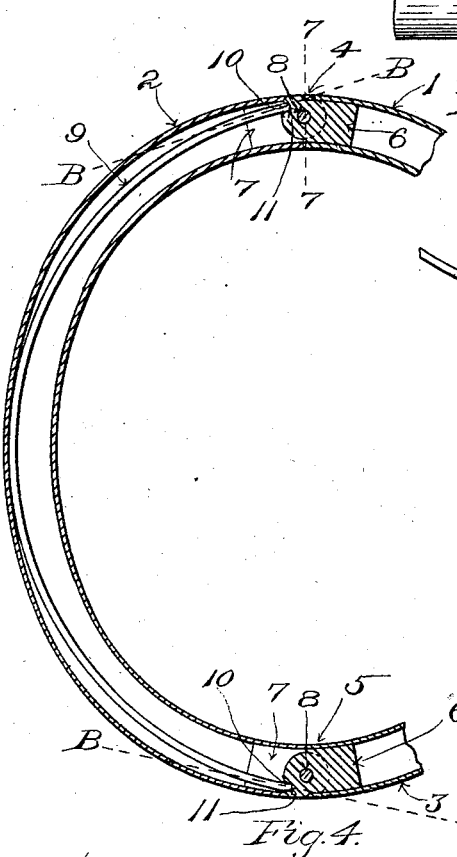
Fig. 4.
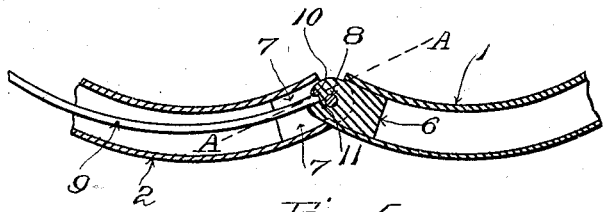
Fig. 3.
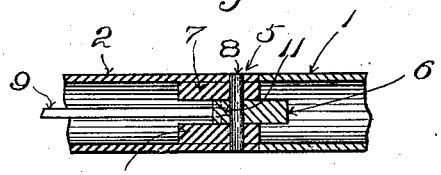
Fig. 5.
Fig. 6.
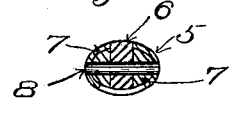
Fig. 7.
Witnesses:
Oscar F. Hill.
Nathan B. Day.
Inventor:
Edward P. Davis
by William A. Copeland
Attorney.

UNITED STATES PATENT OFFICE.

EDWARD P. DAVIS, OF WRENTHAM, MASSACHUSETTS, ASSIGNOR TO WHITING & DAVIS, OF WRENTHAM, MASSACHUSETTS, A COPARTNERSHIP.

BRACELET OR THE LIKE.

SPECIFICATION forming part of Letters Patent No. 725,322, dated April 14, 1903.

Application filed September 27, 1902. Serial No. 125,029. (No model.)

*To all whom it may concern:*

Be it known that I, EDWARD P. DAVIS, of Wrentham, in the county of Norfolk and State of Massachusetts, have invented certain new and useful Improvements in Bracelets or the Like, of which the following is a specification.

One object of the invention is to provide a joint for articles, such as bracelets and the like, which are made in sections, whereby the article may be opened and held open until desired to be closed and when closed may be held in a closed position until desired to be opened. When the sections of the bracelet are made of hollow ware and the hinge-pin has its bearings simply in the wall of the tube, the joint is liable to crack open after being in use a short time.

A second object of this invention is to form a solid joint for connecting the sections when made of hollow ware, thus securing greater strength and presenting a smoother outside appearance when the joint is open.

The invention is especially intended to be applied to the manufacture of bracelets, and the drawings illustrate the invention as embodied in such an article, but it is not intended to be limited to such use.

The invention will now be described by reference to the accompanying drawings, and the several novel features will be particularly pointed out in the claims at the close of this specification.

Referring now to the drawings, Figure 1 shows a plan view of a bracelet embodying my invention. Fig. 2 is an elevation taken at right angles to Fig. 1 viewed from the left. Fig. 3 is an end elevation of a portion of two adjacent sections of a bracelet, showing the hinged joint when the bracelet is in a closed position. Fig. 4 is a longitudinal section showing the joints of the bracelet when closed. Fig. 5 is a longitudinal section showing the joint when open. Fig. 6 is a longitudinal section taken at right angles to that in Fig. 4. Fig. 7 is a section on the line 7 7 in Fig. 4.

A bracelet embodying my invention may be made in two sections, or it may be made in three or more sections, if desired. However, I prefer and have in the drawings shown a bracelet made of three sections 1, 2, and 3, the middle section 2 being joined to the two end sections at 4 and 5, respectively. The end sections 1 and 3 should not be connected together at their adjacent ends, or, if connected, they should be capable of separation, so that they may be turned back on the joints 4 and 5. If two sections only are used, it is obvious that they should have two adjacent ends joined and the other two adjacent ends separable. As my invention more particularly resides in the special form in which I construct the hinge by which two adjacent sections are joined, I will describe in detail the construction of the same.

The joining of the different sections of the bracelet is effected by means of a hinge consisting of a tongue-piece 6, brazed, soldered, or otherwise secured within the end of one of the sections, which tongue-piece is adapted to be inserted between the cheek-pieces 7, which are secured by solder or other appropriate means within the end of the adjacent section. A pin 8, passing through the cheek-pieces 7 and the tongue-piece 6, lying between the said cheek-pieces, forms the hinge-pin upon which the sections in which the cheek and tongue pieces, respectively, are secured may turn. While the form of the outline given to the cheek and tongue pieces is immaterial so long as the results hereinafter described are attainable, I recommend making the said pieces of substantially the proportions and shapes shown in the drawings, since I have found that these will produce a hinge of a neat and finished appearance and one which may be manipulated without producing a gap at the joint, which mars the ornamental appearance of the bracelet and is a menace to the comfort of the wearer. For the purpose of causing the hinge members to remain in their opened or closed positions, as desired, I make use of a spring, located in one of the hinged sections and capable of exerting a force substantially parallel to the axis of the bracelet at the point of the hinge in the same. The spring so located in one of the hinged members is adapted to have a bearing or point of contact with the hinge member of the adjacent section, so that it will exert its force on one or on the other side of the hinge-pin, according as whether the said hinge is in its open or its closed position. The manner in which I accomplish this result in my invention is as follows: 9 is a spring, which may be made of any suitable material or shape and which is adapted to lie within one of the preferably tubular sections of the bracelet. The said spring is preferably located in the middle section 2 of the bracelet and may consist of any form of spring secured thereto which is adapted to exert pressure in a direction substantially parallel with the axis of the bracelet at the place in which the said hinge is located. The preferred and the simplest form of spring, the one which I recommend and have shown in the drawings, is composed of a wire or spring material which is cut to a length determined by the considerations hereinafter mentioned, bent to conform substantially with the shape of the section within which it is to be introduced, and is positioned therein as shown. The ends of the spring are then inserted within the recesses or seats 10, drilled or otherwise suitably prepared for their reception in the edges of the tongue-pieces 6, and the hinge members may then be sprung into position and secured together by inserting the pivotal or hinge pins 8. The length of the spring 9 and the depth of the recesses or seats 10, prepared for the same in the tongue-pieces, should preferably be such that considerable pressure in the longitudinal direction of the bracelet must be exerted in order to overcome the elasticity of the spring and to spring the hinge members sufficiently close together to allow the hinge-pin 8 to be inserted. When this has been done, the resiliency of the said spring in its tendency to resume its normal position will supply to the operative ends of the spring force which is exerted in a line substantially parallel with the longitudinal axis of the bracelet and which may be utilized in a manner hereinafter more particularly described to hold the bracelet-hinge in its open or closed position, as desired.

In the construction I have just described it is evident that a single continuous strip of spring material may be employed to control simultaneously the action of the hinges at the ends of the section in which the spring is located, inasmuch as the tendency to longitudinal slip as the said spring is put under strain by the operation of the hinge at one end is resisted by the seating or bearing of the (for the moment) inoperative end in the hinge member located at the other end thereof. However, if desired, a single spring may be used to control each hinge separately, each spring being properly secured in its place to prevent longitudinal slip. Moreover, any form of spring may be employed which will exert force in the required direction—as, for example, a spiral compression-spring—or a spring whose elasticity is furnished by rubber or any similar elastic substance. The position of the recess or seat in the tongue-piece or hinge member within or against which the operative end of the spring bears is so chosen that the force due to the strained condition of the spring and communicated by its operative end will be exerted, in the open position of the hinge, in a line A A, passing inside the hinge-pin—that is, between the hinge-pin and the center of the bracelet. When the hinge is in its closed position, the line in which the force of the spring is exerted should pass outside of the hinge-pin, as B B. It is thus apparent that the force of the spring will hold the hinge members in their open or closed positions until it may be desired to close or to open the same.

While I have above described the spring as lying in that section of the bracelet-hinge in which the cheek-pieces are fixed and as having the end thereof bearing against the tongue-piece, it is to be understood that the positions of these parts may be interchanged, so that the spring may be located in the section carrying the tongue-piece and have a bearing in the cheek-pieces carried by the adjoining section.

The seats in the tongue-pieces 6 for the ends of the spring 9 are preferably formed by a notch 10, transversely of the tongue-piece, and still further deepened by a slot or recess 11, drilled in the bottom of the notch.

In a joint constructed as shown and described herein there are no outside protuberances. When the joint is closed, as shown in Figs. 1, 3, and 4, the surface about the joint is entirely smooth, showing merely the lines on which the joint opens. The tongue and the cheek pieces form a solid bearing for the hinge-pin. The spring 9 is entirely concealed at all times, both when the joint is closed and when open. The gap between the sections of tubing when open is bridged over by the rounded bottom of the joint formed by the tongue and cheek pieces.

What I claim is—

1. In a bracelet or the like, comprising a plurality of hinged sections, a spring located in one of the hinged sections and arranged to exert force in a line substantially perpendicular to a section of the bracelet at the point of hinging, the said spring having its operative end bearing upon the other hinge member in such a point that the line of the force exerted by the spring will pass on one side of the hinge-pin when the said hinge is open and on the other side thereof when the said hinge is closed, substantially as described.

2. In a bracelet or the like, consisting of a plurality of hinged sections, interengaging tongue and cheek pieces located in the ends of adjoining sections and secured together by a pivotal pin and a spring located in one of the said sections capable of exerting force in a line substantially perpendicular to a section of the bracelet at the point of hinging, the said spring having its operative end bearing upon the hinge member of the adjoining section at such a point that the line of the force exerted by the spring will pass onto one side of the pivotal pin when the hinge is in its open position and to the other side of the said pivotal pin when the said hinge is in its closed position, substantially as described.

3. In a bracelet or the like consisting of a plurality of hinged sections, and containing the mechanism substantially as described for holding the hinge members in their open or closed position, a single spring located in one of the said hinged sections and held in tension between the hinge members carried by the adjoining sections so that the single spring exerts simultaneously upon either hinge member the force necessary to maintain the same in the desired position.

4. In a bracelet or the like consisting of a plurality of hinged sections, interengaging tongue and cheek pieces located in the ends of adjoining sections and secured together by a pivotal pin, a hole in the end of said tongue-piece, a spring located in the cheek-section and having its outer end seated in the hole in said tongue-piece, said seat for the spring being so located that when the bracelet is open the spring exerts pressure upon the tongue-section in a line which extends on the inner side of the hinge-pin, and when the bracelet is closed the line of pressure will be upon the outer side of the hinge-pin, substantially as described.

5. In a bracelet or the like consisting of a plurality of hinged sections, interengaging tongue and cheek pieces located in the ends of adjoining sections and secured together by a pivotal pin, a spring located in one of said hinged sections and having its outer end bearing upon the adjacent hinged member in such a point that when the bracelet is closed the line of force exerted by the spring will be one side of the hinge-pin and when the bracelet is opened the line of pressure will be shifted to the other side of the hinge-pin, substantially as described.

In testimony whereof I have affixed my signature in presence of two witnesses.

EDWARD P. DAVIS.

Witnesses:
WILLIAM A. COPELAND,
ALICE H. MORRISON.